Aug. 12, 1947.  B. OESTRICHER  2,425,388
PLASTIC INNER SOLE
Filed April 23, 1943   2 Sheets-Sheet 1
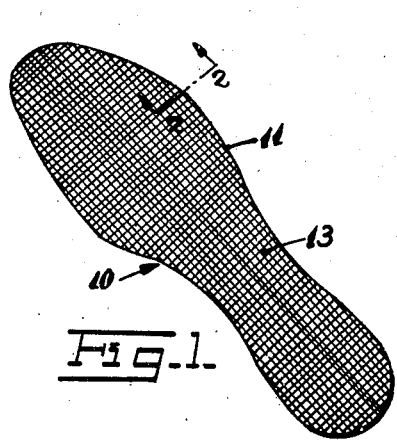
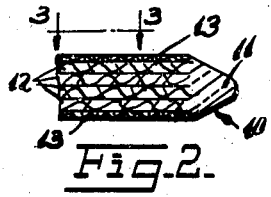
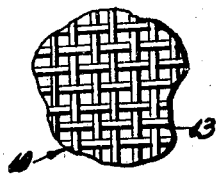
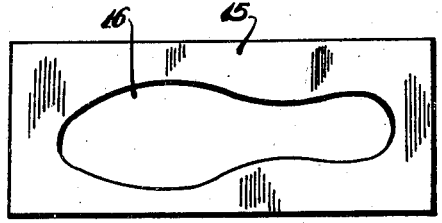
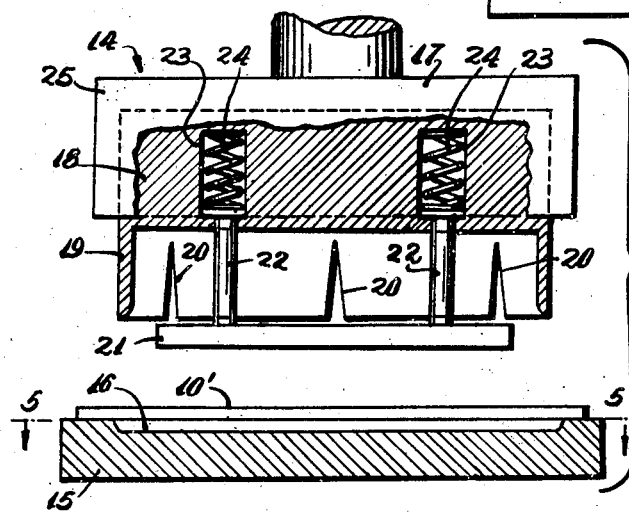
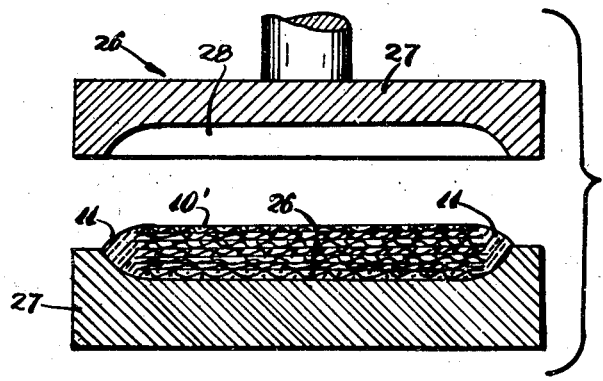
INVENTOR.
Bernard Oestricher
BY
ATTORNEY Aug. 12, 1947.   B. OESTRICHER   2,425,388
PLASTIC INNER SOLE
Filed April 23, 1943   2 Sheets-Sheet 2
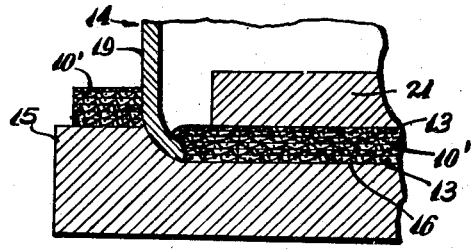
Fig. 6.
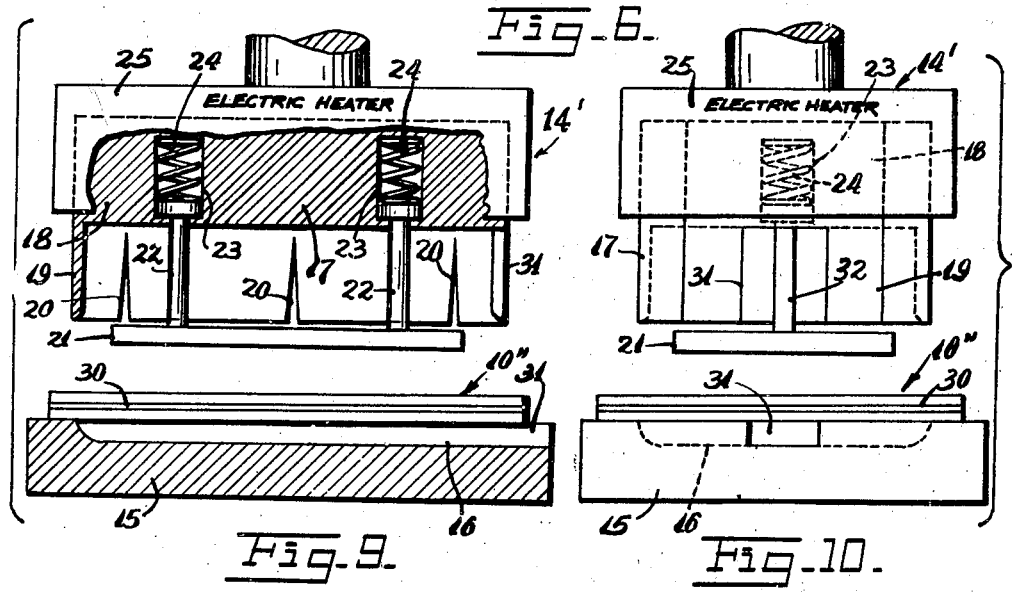
Fig. 9.   Fig. 10.
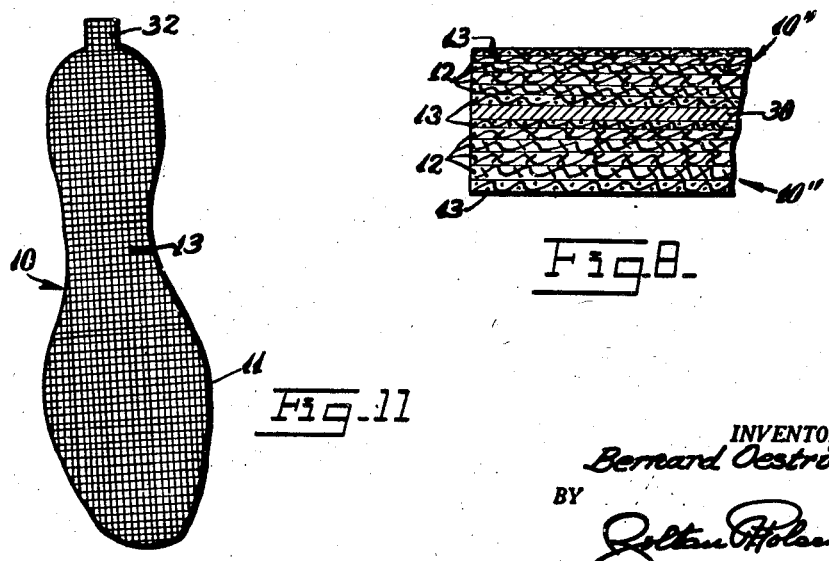
Fig. 8.
Fig. 11
INVENTOR.
Bernard Oestricher
BY
ATTORNEY Patented Aug. 12, 1947

2,425,388

UNITED STATES PATENT OFFICE 2,425,388

PLASTIC INNER SOLE

Bernard Oestricher, Brooklyn, N. Y.

Application April 23, 1943, Serial No. 484,132

3 Claims. (Cl. 154—42)

This invention relates to new and useful improvements in plastic inner soles and methods and means for the manufacture thereof.

More specifically, the invention proposes the construction of plastic inner soles formed of a plurality of super-imposed layers of plastic fabric of open mesh weave to be worn in the shoes of soldiers and other persons in tropical areas to protect their feet against the terrific heat of the terrain over which they must walk.

Still further, the invention proposes a novel means for fusing together the edges of the superimposed layers of the inner sole in a manner to form an integral unit of the layers from which the inner sole is made.

Another object of the invention proposes the construction of dies between which the superimposed layers of plastic fabric from which the inner sole is to be formed may be placed for cutting the layers to the shape of an inner sole when the die sections are brought together.

Still another object of the invention proposes the provision of a means for heating one of the die sections, so as to melt the material of the layers during the cutting operation in a manner to accomplish the fusing of the edges which was mentioned above.

It is another object of this invention to provide a press into which the cut inner sole may be engaged while the melted edges thereof are still soft in a manner to press these edges together to insure a proper fusion thereof and to impart a bevel to all edges.

A modification of the invention proposes a method whereby a number of superimposed inner soles may be cut and have their edges melted at the same time in a manner so that a number of like inner soles may be cut at one time.

It is still another object of this invention to construct an inner sole which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a perspective view of an inner sole constructed of plastic material in accordance with this invention.

Fig. 2 is an enlarged partial vertical sectional view taken on the line 2—2 of Fig. 1.

Fig. 3 is a partial enlarged plan view looking in the direction of the line 3—3 of Fig. 2.

Fig. 4 is a side elevational view partially in vertical section of the cutting dies used for forming the inner sole.

Fig. 5 is a plan view of the bottom die looking in the direction of the line 5—5 of Fig. 4.

Fig. 6 is a vertical sectional view of a portion of the dies when brought together.

Fig. 7 is a vertical sectional view of the press in which the final shaping and pressing operation is carried out.

Fig. 8 is a vertical sectional view of a portion of a plurality of superimposed layers for forming two inner soles with one cutting operation.

Fig. 9 is a side elevational view partially in vertical section of the cutting dies for carrying out the cutting operation.

Fig. 10 is an end elevational view of Fig. 9.

Fig. 11 is a plan view of the inner soles as they appear when removed from the cutting dies shown in Figs. 9 and 10.

The plastic inner sole, according to this invention, is shown in detail in Figs. 1 to 3. The inner sole 10 is constructed of a plurality of superimposed plastic fabric layers of inner sole shape fused together at their edges 11. Specifically, the inner sole 10 includes a plurality, preferaly four, of layers 12 of coarsely woven, fibre glass or plastic materials which will melt with the application of heat. The exposed layers 13 are of finely woven fibre glass or plastic materials. All the layers 12 and 13 are of an open mesh weave so that air may circulate freely therethrough. Such inner soles are of extreme value to soldiers and other persons working in the desert or other warm places as they will protect the wearers feet by providing insulating air spaces between the bottom of the foot and the interior face of the sole of the shoe.

In Figs. 4 to 6 the dies 14 are shown for cutting the inner sole to the desired shape and for melting the material of the layers at their edges making it possible to fuse these edges to cause the layers 12 and 13 to be joined together as a single unit. The dies 14 consist of a female die section 15 having a curved edge recess 16 made in the shape of the inner sole 10 to be formed. The superimposed layers from which the inner sole 10 is to be laid across the recess 16 as shown at 10' in Fig. 4.

Positioned above the female die section 15 there is a male die section 17. This male die section 17 consists of a body portion 18 from which downwardly extending knives 19 extend. These knives 19 are flexible and shaped to conform with the shape of the recess 16 in the female die section 15. Cutouts 20 are extended inwards from the bottom edges of the knives 19 and permit the portions of the knives 19 to flex inwards and slide along the curved edge of recess 16 as shown in Fig. 6 when the male die section 14 moves towards the female die section 15, as shown in Fig. 6.

Means is provided for clamping the material 10' in position for preventing it from shifting during the cutting operation. This means includes a pressure foot 21 extended from the bottom of the male die section 14 and mounted upon the bottom of rods 22. The rods 22 extend vertically upwards into openings 23 formed in the body 18 of the male die section 14. Springs 24 are positioned in the openings 23 and bear against heads formed upon the top ends of the rods 22 urging them into their extended positions shown in Fig. 4. As the male die section 14 is lowered the pressure foot 21 will engage the material 10' and press it into the recess 16 of the female die section and securely hold it in position during the cutting operation.

An electric heater 25 is mounted over the top of the male die section 14 for heating the die section and more particularly the knives 19 thereof. The knives 19 when heated by the heater 25 will cause the cut edges of the material 10' to be melted so that the edges 11 of the layers 12 and 13 may be fused to form a unit of these layers. It will be noted from Fig. 6 that during the cutting operation the bottom edges of the knives 19 will be bent beneath the cut edges of the material 10' to thoroughly melt these edges as said knives engage and bend inwardly along the curved edge of recess 16 in die 15.

In Fig. 7 a press 26 is illustrated for pressing together and imparting an opposed beveled shape to the molten edges of the layers 12 and 13 of the inner sole 10 while these edges are still soft. The press 26 comprises opposed press sections 27 formed with opposed recesses into which the cut material 10' is adapted to be engaged. The sections 26 are then brought together for pressing the still molten edges together and for shaping it as shown in Fig. 2.

The method of forming the inner sole 10 is as follows:

First, the heater 25 is energized for heating the knives 19 of the male die section 17 of the cutting dies 16. Next the layers of material 12 and 13 are superimposed in their uncut condition upon the female section 15 as shown at 10' in Fig. 4. After the male die section 17 has become sufficiently heated the male die section 17 is moved towards the female die section to cut the material 10' to the shape of the inner sole and simultaneously the heat of the knives 19 will melt the superimposed edges of the cut material.

The die sections 15 and 17 are then separated and while the edges 11 of the material 10' is still soft the material is transferred to the press 26. The press sections 27 are then brought together for compressing the molten edges and shaping them as shown in Fig. 2. After the elapse of a sufficient time to permit the molten edges 11 to set the press 26 is opened and the completed inner sole is removed and laid aside for a period to completely cool. The completed inner sole 10 will appear as shown in Fig. 1. Melting and beveling the edges 11 of the inner sole will provide a smooth surface and prevent unraveling of the edges of the layers 12 and 13 and prevent sharp edges from coming in contact with the soles of the wearer's feet.

In Figs. 8 to 11 a modification of the invention is shown which permits a number of inner soles to be cut and have their edges melted at one time. In this form of the invention a plurality of layers of material 10'' are superimposed one on the other with a layer of wax paper 30 between the layers. Each of the layers of material 10'' is made up of four coarse center layers 12 covered by finer outer layers 13, as in the previous form of the invention.

The dies 14' for cutting the inner sole material 10'' are characterized by the fact that the matching back portions of the dies are formed to provide cutout areas 31 at the back which will render the cutting die flexible and will not cut the complete outline of the inner sole 10 leaving small tab portions 32 at the back of the material 10'' which will be unmelted permitting the superimposed layers to be separated at the wax paper 30 by gripping the tabs 32 and pulling them apart. These tabs 32 are then quickly cut off manually before the inner soles are separately engaged into the press 26 for the complete pressing and shaping operation.

In other respects this form of the invention is similar to that previously described, and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. Means for the manufacture of plastic inner soles, comprising a base die section having a curved edge recess in its top face, a top cutting die section having a flexible cutting edge for cutting superimposed layers of plastic material into the shape of an inner sole as the flexible cutting edge enters the recess and is bent by engagement with the curved recess in the bottom die section, and means on said top die section for holding said layers against shifting during the cutting operation.

2. Means for the manufacture of plastic inner soles, comprising a base die section having a curved edge recess in its top face, a top cutting die section having a flexible cutting edge for cutting superimposed layers of plastic material into the shape of an inner sole as said cutting edge enters the recess in the bottom die section and engages said curved edge, means on said top die section for holding said layers against shifting during the cutting operation, and means for heating said top die section to melt the superimposed cut edges of the inner sole during the cutting operation so these edges may be fused to form a unit of said layers.

3. Means for the manufacture of plastic inner soles, comprising a base die section having a curved edge recess in its top face, a top cutting die section having a flexible cutting edge cooperating with said surved edge for cutting superimposed layers of plastic material into the shape of an inner sole as the top die section enters the recess in the bottom die section, means on said top die section for holding said layers against shifting during the cutting operation, and said die section having open areas for leaving portions of said layers uncut and for rendering said cutting edge flexible.

BERNARD OESTRICHER.

REFERENCES CITED

The following references are of record in the file of this patent:

UNITED STATES PATENTS

| Number | Name | Date |
|---|---|---|
| 2,232,640 | Schwartzman | Feb. 18, 1941 |
| 1,974,203 | Collins | Sept. 18, 1934 |
| 2,232,640 | Schwartzman | Feb. 18, 1941 |
| 426,577 | Whittlesey et al. | Apr. 29, 1890 |